[12] United States Patent
Grobelny et al.

(10) Patent No.: US 11,809,876 B2
(45) Date of Patent: Nov. 7, 2023

(54) TRUSTED PLATFORM MODULE PROTECTION FOR NON-VOLATILE MEMORY EXPRESS (NVME) RECOVERY

(71) Applicant: Dell Products L.P., Round Rock, TX (US)

(72) Inventors: Nicholas D. Grobelny, Austin, TX (US); Shun-Tang Hsu, Taipei (TW); Lip Vui Kan, Singapore (SG); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 17/243,804

(22) Filed: Apr. 29, 2021

(65) Prior Publication Data
US 2022/0350615 A1    Nov. 3, 2022

(51) Int. Cl.
*G06F 9/4401* (2018.01)
*H04L 9/08* (2006.01)

(52) U.S. Cl.
CPC ............ *G06F 9/4408* (2013.01); *H04L 9/088* (2013.01)

(58) Field of Classification Search
CPC ...... G06F 9/4408; G06F 9/4416; G06F 21/57; H04L 9/088
See application file for complete search history.

(56) References Cited

U.S. PATENT DOCUMENTS

| | | | | |
|---|---|---|---|---|
| 8,756,417 | B1* | 6/2014 | Gardner | G06F 9/441 709/224 |
| 2005/0278778 | A1* | 12/2005 | D'Agostino | G06F 21/34 713/185 |
| 2006/0282652 | A1* | 12/2006 | El-Haj-mahmoud | G06F 9/4408 713/1 |
| 2010/0318781 | A1* | 12/2010 | Nicolson | G06F 21/575 713/2 |
| 2016/0055113 | A1* | 2/2016 | Hodge | G06F 13/4022 710/308 |
| 2017/0177873 | A1* | 6/2017 | Raghuram | H04L 9/0894 |
| 2021/0397716 | A1* | 12/2021 | Kovah | H04L 63/0823 |

* cited by examiner

*Primary Examiner* — Jaweed A Abbaszadeh
*Assistant Examiner* — Hyun Soo Kim
(74) *Attorney, Agent, or Firm* — Jackson Walker L.L.P

(57) ABSTRACT

An information handling system is configured to support first and second boot sequences, which invokes first and second bootloaders respectively. The bootloaders may be stored in an NVMe storage boot partition. Each bootloader may be associated with a corresponding encryption key generated by a trusted platform module, which may seal the first and second keys in accordance with one or more measurements taken during the respective boot sequences. The system determines whether a boot sequence in progress comprises is to invoke the first or second bootloader. The system then unseals the appropriate encryption key to access the appropriate bootloader. The first bootloader may be a host OS bootloader and the second bootloader may be for a recovery resource invoked when the host OS fails to load. The recovery resource may enables BIOS to connect to a remote store and download an image via a HTTP mechanism.

15 Claims, 2 Drawing Sheets

TRUSTED PLATFORM MODULE PROTECTION FOR NON-VOLATILE MEMORY EXPRESS (NVME) RECOVERY

TECHNICAL FIELD

The present disclosure relates to information handling systems and, more specifically, recovering a faulty information handling.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When an information handling system is reset, the system typically executes firmware that performs a boot process to initialize various system components and interfaces, load an operating system, and perform various other actions to configure the system into a known and initial state. Historically, basic input/output system (BIOS) was the de facto standard for boot process firmware. More recently, firmware compliant with the unified extensible firmware interface (UEFI) specification has evolved to address various limitations inherent in BIOS.

A UEFI-compliant boot process may define a boot manager that checks the boot configuration and, based on its settings, executes the specified OS boot loader. However, if a system is unable to boot to the operating system after repeated attempts and a pre-boot system performance check detects no hardware issues, it may be desirable to provide a method for recovering the operating system.

SUMMARY

In accordance with teachings disclosed herein, common problems associated with conventional boot loaders and system recovery tools are addressed by methods and systems for booting a recovery resource from protected regions of a non-volatile memory express (NVMe) storage device.

Disclosed methods may define a protected region of an NVMe storage device as a boot partition that stores a bootloader for a recovery resource that enables BIOS to establish a network connection (e.g., via HTTP) to a remote store and download an image, such as a diagnostic OS image. An authentication key may be associated with the boot partition and used to ensure that operations attempting to write to the boot partition originate from an authorized entity. The authentication key may be implemented as a replay protected media block (RPMB) authentication key to detect unauthorized writes to the boot partition. However, because RPMB authentication keys do not support read protection, additional measures are necessary to protect certain information, including information used for establishing recovery tunnels to trusted servers.

In at least one embodiment, the write protection necessary to deter unauthorized access to boot partition code and the read protection necessary to deter discovery of boot partition data are both achieved with a trusted platform module and, more specifically, by encrypting recovery resource secrets and the RPMC authentication keys using one or more TPM keys. The TPM keys may be sealed to the measured state of the platform as indicated by the TPM's platform configuration registers (PCRs) at specified points in the boot sequence. In at least one embodiment, the TPM key(s) may be tied to the measured platform state at the point when the recovery resource is invoked. Measurements unique to the recovery resource may be sent to the TPM both before and after access to ensure that keys can only be utilized at the exact moment needed for the recovery resource. In at least one embodiment, one or both of the bootloaders is configured to validate values stored in one or more TPM PCRs as part of the bootloader execution flow.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
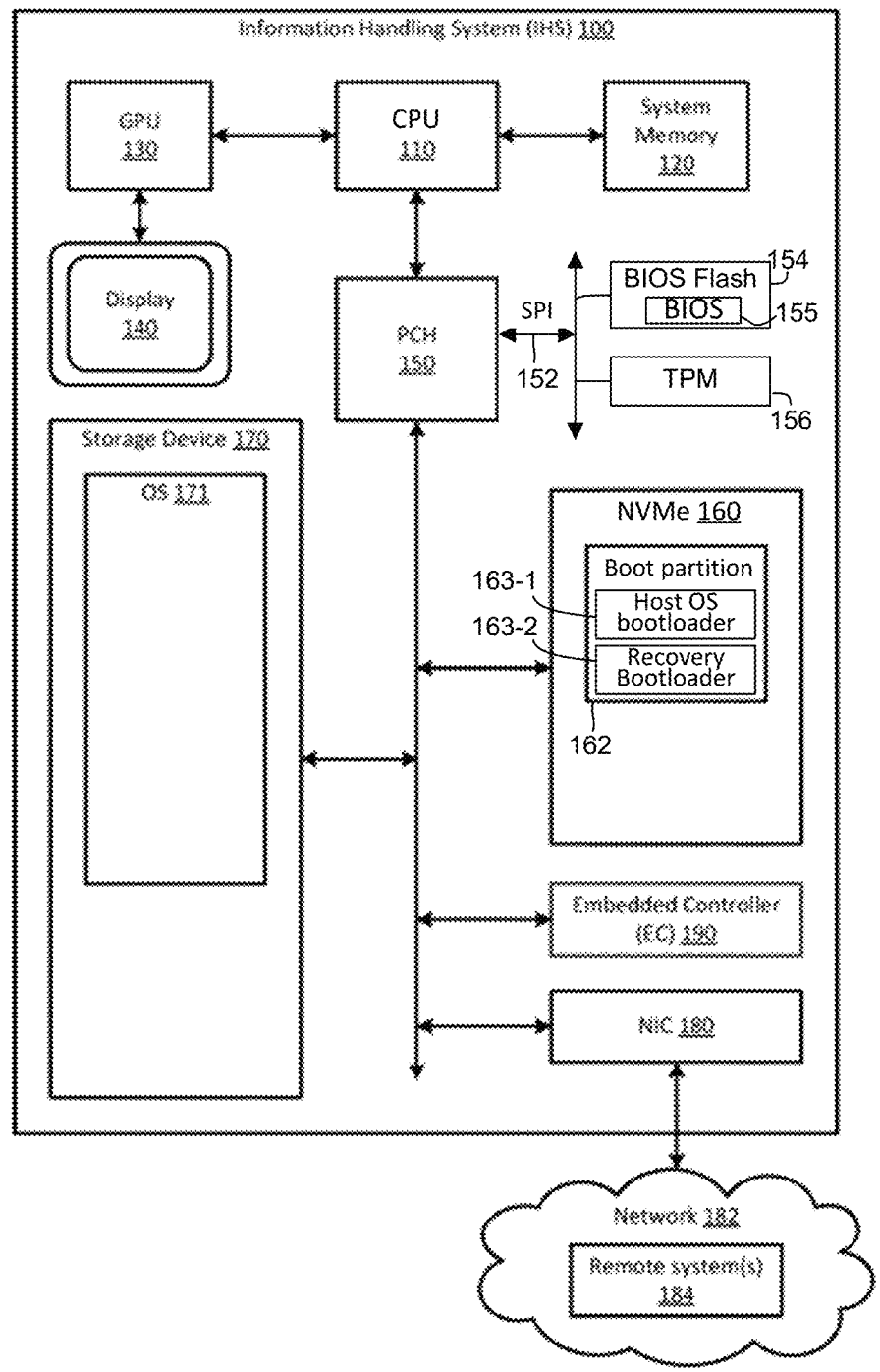
FIG. 1 is a block diagram of an information handling system in accordance with disclosed subject matter.
Figure 2:
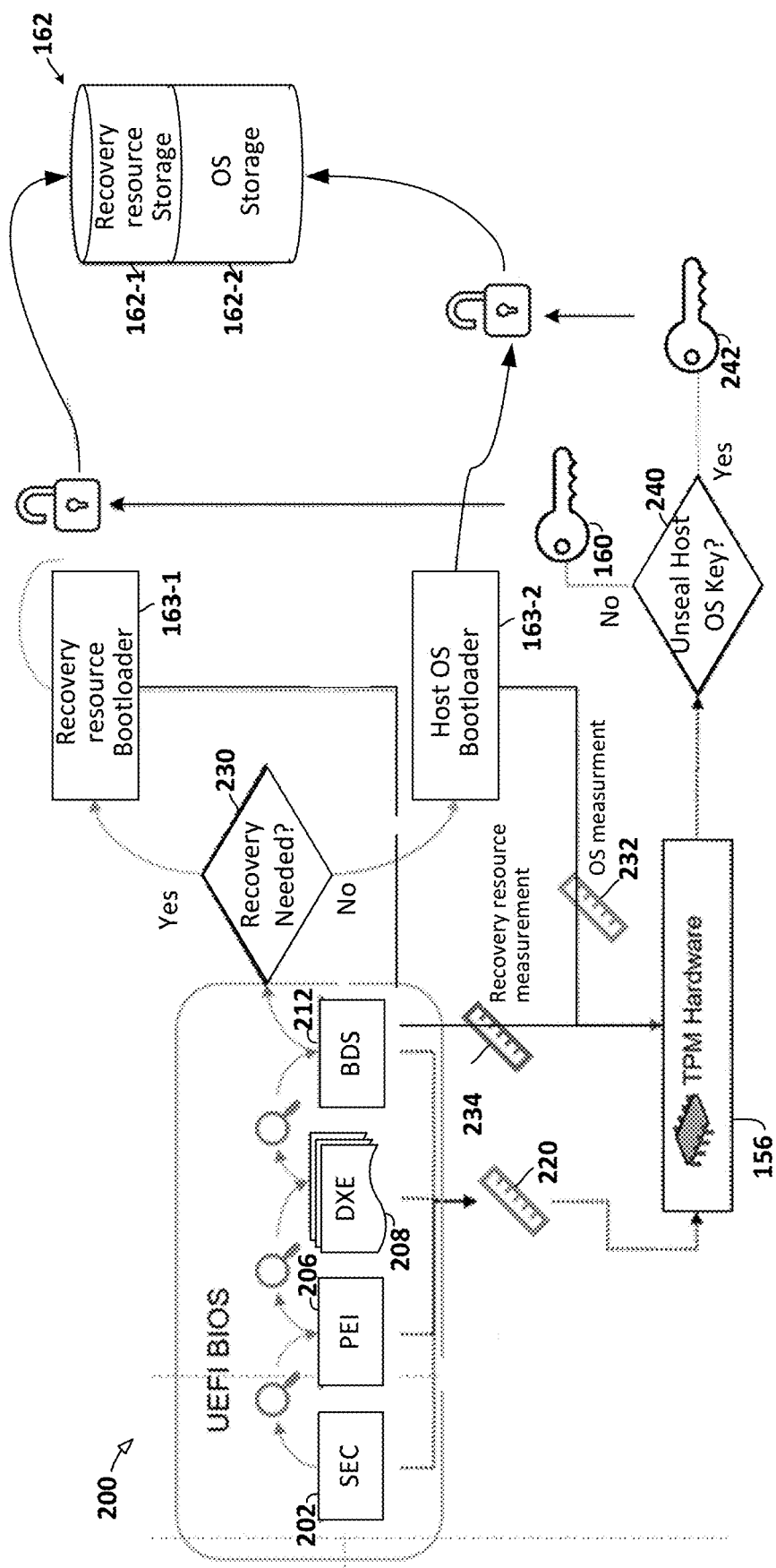
FIG. 2 illustrates a secure method for invoking a resource recovery boot loader.

Exemplary embodiments and their advantages are best understood by reference to FIGS. 1-2, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

FIG. 1 is a block diagram of an exemplary information handling system 100 (e.g., a desktop computer, laptop computer, tablet computer, server, Internet of Things (IoT) device, etc.) as it may be configured according to one embodiment of the present disclosure. As shown in FIG. 1, IHS 100 may generally include at least one central processing unit (CPU) 110 (e.g., a host processor), a system memory 120, a graphics processor unit (GPU) 130, a display device 140, a platform controller hub (PCH) 150, BIOS flash 154 containing BIOS firmware 155, a trusted platform module 156, a non-volatile memory express (NVMe) storage resource 160, a computer readable storage device 170, a network interface card (NIC) 180, and an embedded controller (EC) 190.

System memory 120 is coupled to CPU 110 and generally configured to store program instructions (or computer program code), which are executable by CPU 110. System memory 120 may be implemented using any suitable memory technology, including but not limited to, dynamic random access memory or any other suitable type of memory. Graphics processor unit (GPU) 130 is coupled to CPU 110 and configured to coordinate communication between the host processor and one or more display components of the IHS. In the embodiment shown in FIG. 1, GPU 130 is coupled to display device 140 and configured to provide visual images (e.g., a graphical user interface, messages and/or user prompts) to the user.

Platform controller hub (PCH) 150 is coupled to CPU 110 and configured to handle I/O operations for the IHS. As such, PCH 150 may include a variety of communication interfaces and ports for communicating with various system components, input/output (I/O) devices, expansion bus(es), and so forth. The PCH 150 illustrated in FIG. 1 interfaces with a serial peripheral interface (SPI) bus 152, to which a BIOS flash 154, containing BIOS firmware 155, and a trusted platform module 156 are coupled. TPM is a secure cryptoprocessor for securing system resources via cryptographic keys. TPM 156 may include a cryptographic processor that includes a random number generator, an asymmetric key generator, a secure hash generator, and a digital signature module. TPM may further include storage resources for storing various keys and platform configuration registers (PCRs).

PCH 150 is further coupled to an NVMe storage resource 160. NVMe storage resource 160 may include a NAND flash solid state drive (SSD) configured with a PCIe interface for coupling to a PCIe bus. The NVMe 160 illustrated in FIG. 1 has been configured with a boot partition 162. The boot partition 162 illustrated in FIG. 1 includes a pair of bootloader objects. The bootloader objects illustrated in FIG. 1 include a host OS bootloader 163-1 and a recovery resource bootloader 163-2.

In at least one embodiment, recovery resource bootloader 163-2 comprises a resource, such as the BIOSConnect resource from Dell Products, which enables a user to recover when the local host OS image is corrupted, replaced, or absent by enabling BIOS to connect to a backend store and to load an image via https method.

Storage device 170 may be any type of persistent, non-transitory computer readable storage device, including non-PCIe storage devices, such as one or more hard disk drives (HDDs) or solid-state drives (SSDs), and may be generally configured to store software and/or data. For example, computer readable storage device 170 may be configured to store an operating system (OS) 171 for the IHS, in addition to other software and/or firmware modules and user data. As known in the art, OS 171 may contain program instructions (or computer program code), which may be executed by CPU 110 to perform various tasks and functions for the information handling system and/or for the user.

NIC 180 enables IHS 100 to communicate with one or more remotely located systems and/or services 184 via an external network 182 using one or more communication protocols. Network 182 may be a local area network (LAN), wide area network (WAN), personal area network (PAN), or the like, and the connection to and/or between IHS 100 and network 182 may be wired, wireless or a combination thereof. For purposes of this discussion, network 182 is indicated as a single collective component for simplicity. However, it is appreciated that network 182 may comprise one or more direct connections to other remote systems and/or services, as well as a more complex set of interconnections as can exist within a wide area network, such as the Internet. NIC 180 may communicate data and signals to/from IHS 100 using any known communication protocol.

Embedded controller (EC) 190 is generally configured to boot the information handling system and perform other functions. EC 190 may generally include read only memory (ROM), random access memory (RAM) and a processing device (e.g., a controller, microcontroller, microprocessor, ASIC, etc.) for executing program instructions stored within its internal ROM and RAM. For example, EC 190 may be configured to execute program instructions (e.g., a boot block) stored within its internal ROM to initiate a boot process for the information handling system.

Referring now to FIG. 2, an exemplary boot sequence is represented in flow diagram format to illustrate features of disclosed subject matter. The boot sequence 200 illustrated in FIG. 2 includes one or more components of an industry standard UEFI BIOS boot sequence including a security (SEC) phase 202, a Pre-EFI initialization (PEI) phase 206, a driver execution environment (DXE) phase 208, and a boot device select (BDS) phase 212. One or more conventional BIOS runtime measurements 220 may be taken before, during, or after any of these stages using TPM 156 including one or more TPM platform configuration registers (PCRs) (not explicitly depicted).

Upon exiting BDS phase 212, the illustrated method determines (block 230) whether a recovery resource is needed. If no recovery resource is needed, the illustrated boot process 200 invokes BIOS 155 (FIG. 1) extends a measurement 232 of host OS bootloader 163-2 into TPM 156. If the measurement matches an expected previously determined value, the illustrated process 200 unseals (block 240) a key 242 for Host OS loader. The host OS loader key 242 unlocks an OS portion 162-1 of boot partition 162 to enable the host to access and execute the Host OS bootloader.

If it is determined at block 230 that a recovery resource is needed, the illustrated boot process 200 invokes BIOS 155 (FIG. 1) to extend a measurement 234 of recovery resource bootloader 163-2 into TPM 156, which alters the state of the TPM PCRs, precisely when recovery resource boot loader 162-2 is accessed. If the measured platform state matches a previously determined expected state, TPM 125 unseals a resource recovery bootloader key 160 that grants access to a resource recovery portion 162-1 of NVMe boot partition 162.

In this manner, TPM 125 releases different encryption keys depending on which boot sequence is measured and the recovery resource portion 152 of the TPM storage device 150 is protected from OS access.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
    configuring an information handling system with a host operating system (OS) boot sequence and a recovery resource boot sequence wherein the host OS boot sequence invokes a host OS bootloader stored in a first part of NVMe storage and the recovery resource boot sequence invokes a recovery resource bootloader stored in a second part of NVMe storage;
    associating the host OS boot sequence with a host OS encryption key and the recovery resource boot sequence with a recovery resource encryption key;
    sealing, in accordance with a first platform configuration register (PCR) measurement unique to the host OS boot sequence, the host OS encryption key;
    sealing, in accordance with a second PCR measurement unique to the recovery resource boot sequence, the recovery resource encryption key;
    responsive to detecting execution of a boot sequence, determining whether the boot sequence invokes the host OS bootloader or the recovery resource bootloader; and
    responsive to determining that the boot sequence invokes the first host OS bootloader, authenticating the host OS bootloader to unseal the host OS encryption key and access the first part of the NVMe storage to execute the host OS bootloader, wherein authenticating the host OS bootloader includes, extending a measurement of the host OS bootloader into the PCR prior to comparing a value of the PCR with a first predetermined value;
    responsive to determining that the boot sequence invokes the recovery resource bootloader, authenticating the recovery resource bootloader to unseal the recovery resource encryption key and access the part of the NVMe storage to execute the recovery resource bootloader wherein authenticating the recovery resource bootloader includes, extending a measurement of the recovery resource bootloader into the PCR prior to comparing a value of the PCR with a second predetermined value.

2. The method of claim 1, wherein the host OS and recovery resource encryption keys are sealed and unsealed by a trusted platform module (TPM) of the information handling system.

3. The method of claim 2, wherein sealing the host OS encryption key comprises sealing the host OS encryption key to a storage resource of the TPM.

4. The method of claim 1, wherein at least one of the host OS and recovery resource bootloaders is stored in an NVMe boot directory.

5. The method of claim 1, wherein the recovery resource authentication key comprises a replay protected media block (RPMB) key.

6. The method of claim 1, wherein the recovery resource enables BIOS to establish a network connection with a remote store and load from the remote store via the network connection an image of a recovery OS.

7. The method of claim 6, wherein confidential information required to establish the network connection is stored in the second part of the NVMe storage.

8. An information handling system, comprising:
a central processing unit; and
a non-transitory computer readable medium including processor executable instructions for a host OS boot sequence, a recovery resource boot sequence, and additional instructions, wherein the host OS boot sequence invokes a host OS bootloader stored in a first part of NVMe storage and the recovery resource boot sequence invokes a recovery resource bootloader stored in a second part of the NVMe storage and wherein the additional instructions, when executed by the CPU cause the system to perform operations including:
associating the host OS boot sequence with a host OS encryption key and the recovery resource boot sequence with a recovery resource encryption key;
sealing, in accordance with a first platform configuration register (PCR) measurement unique to the host OS boot sequence, the host OS encryption key;
sealing, in accordance with a second PCR measurement unique to the recovery resource boot sequence, the recovery resource encryption key;
responsive to detecting execution of a boot sequence, determining whether the boot sequence invokes the host OS bootloader or the recovery resource bootloader; and
responsive to determining that the boot sequence invokes the host OS bootloader, authenticating the host OS bootloader to unseal the host OS encryption key and access the first part of the NVMe storage and execute the host OS bootloader, wherein authenticating the host OS bootloader includes, extending a measurement of the host OS bootloader into the PCR prior to comparing a value of the PCR with a first predetermined value;
responsive to determining that the boot sequence invokes the recovery resource bootloader, authenticating the recovery resource bootloader to unseal the recovery resource encryption key and access the second part of the NVMe storage and execute the recovery resource bootloader wherein authenticating the recovery resource bootloader includes, extending a measurement of the recovery resource bootloader into the PCR prior to comparing a value of the PCR with a second predetermined value.

9. The information handling system of claim 8, wherein the host OS and recovery resource encryption keys are sealed and unsealed by a trusted platform module of the information handling system.

10. The information handling system of claim 9, wherein sealing the host OS encryption key comprises sealing the host OS encryption key to a storage resource of the TPM.

11. The information handling system of claim 9, wherein at least one of the host OS and recovery resource bootloaders is configured wherein the bootloader, when executed, validates values stored in one or more platform configuration registers (PCRs) of the trusted platform module.

12. The information handling system of claim 8, wherein at least one of the host OS and recovery resource bootloaders is stored in an NVMe boot directory.

13. The information handling system of claim 8, wherein an authentication key for the recovery resource bootloader is encrypted by the recovery resource encryption key and wherein the authentication key comprises a replay protected media block (RPMB) key.

14. The information handling system of claim 8, wherein the recovery resource enables BIOS to establish a network connection with a remote store and load from the remote store via the network connection an image of a recovery OS.

15. The information handling system of claim 14, wherein confidential information required to establish the network connection is stored in the second part of the NVMe storage.

* * * * *